US011359531B2

(12) United States Patent
Lauritano et al.

(10) Patent No.: US 11,359,531 B2
(45) Date of Patent: Jun. 14, 2022

(54) METHOD FOR CONTROL OF EXHAUST AFTERTREATMENT FOR DIESEL ENGINE

(71) Applicant: GM Global Technology Operations LLC, Detroit, MI (US)

(72) Inventors: Luca Lauritano, Turin (IT); Daniela Meola, Turin (IT); Andrea Pannuzzo, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 182 days.

(21) Appl. No.: 16/523,482

(22) Filed: Jul. 26, 2019

(65) Prior Publication Data
US 2021/0025306 A1   Jan. 28, 2021

(51) Int. Cl.
| | |
|---|---|
| *F01N 3/00* | (2006.01) |
| *F01N 3/20* | (2006.01) |
| *F01N 3/035* | (2006.01) |
| *F02D 41/02* | (2006.01) |
| *F01N 13/00* | (2010.01) |
| *B01D 53/94* | (2006.01) |
| *B01D 46/00* | (2022.01) |

(52) U.S. Cl.
CPC ......... *F01N 3/208* (2013.01); *B01D 46/0027* (2013.01); *B01D 53/9418* (2013.01); *B01D 53/9495* (2013.01); *F01N 3/035* (2013.01); *F01N 13/0093* (2014.06); *F02D 41/029* (2013.01); *F01N 2610/02* (2013.01); *F01N 2610/146* (2013.01); *F01N 2900/0416* (2013.01); *F01N 2900/1402* (2013.01); *F01N 2900/1404* (2013.01)

(58) Field of Classification Search
CPC .......................... F01N 3/208; B01D 53/9418
USPC ......................................................... 60/274
See application file for complete search history.

(56) References Cited

U.S. PATENT DOCUMENTS

| | | | |
|---|---|---|---|
| 2004/0011026 A1* | 1/2004 | Nakatani ............... | F01N 13/011 60/286 |
| 2010/0101218 A1* | 4/2010 | Gabe .................... | F01N 13/0093 60/286 |
| 2011/0041477 A1* | 2/2011 | Mullins ................. | F01N 3/0821 60/274 |
| 2011/0113752 A1* | 5/2011 | Christner .............. | F01N 9/005 60/274 |
| 2011/0113753 A1* | 5/2011 | Christner .............. | F01N 3/208 60/274 |
| 2011/0308233 A1* | 12/2011 | Darr ..................... | F01N 3/208 60/276 |
| 2011/0311420 A1* | 12/2011 | Perrin ................... | F01N 3/208 422/107 |

(Continued)

*Primary Examiner* — Jason D Shanske
(74) *Attorney, Agent, or Firm* — Vivacqua Crane PLLC

(57) ABSTRACT

A method of controlling an exhaust system for a diesel engine comprises providing an aftertreatment system comprising a first catalyst and a diesel exhaust fluid injection system, determining a preliminary dose of a diesel exhaust fluid of the diesel exhaust fluid injection system based on an incoming exhaust gas flow and an exhaust gas temperature, determining an $NH_3$ factor based on incoming exhaust gas oxygen concentration and the incoming exhaust gas flow temperature, and determining a final dose of diesel exhaust fluid by multiplying the preliminary dose of diesel exhaust fluid by the $NH_3$ factor.

12 Claims, 2 Drawing Sheets

(56) References Cited

U.S. PATENT DOCUMENTS

| | | | |
|---|---|---|---|
| 2012/0079812 A1* | 4/2012 | Masaki | B01D 53/9495 |
| | | | 60/287 |
| 2013/0104637 A1* | 5/2013 | Kowalkowski | F01N 3/2066 |
| | | | 73/114.71 |
| 2014/0033682 A1* | 2/2014 | Schweizer | F01N 3/10 |
| | | | 60/276 |
| 2014/0363358 A1* | 12/2014 | Udd | B01D 53/9431 |
| | | | 423/212 |
| 2015/0218993 A1* | 8/2015 | Chavannavar | F01N 3/208 |
| | | | 422/111 |
| 2017/0074137 A1* | 3/2017 | Sannino | F01N 11/007 |
| 2018/0080359 A1* | 3/2018 | Price | F01N 3/035 |
| 2018/0291783 A1* | 10/2018 | Smith | F01N 3/208 |
| 2019/0250123 A1* | 8/2019 | Okamoto | G01N 27/301 |

* cited by examiner

METHOD FOR CONTROL OF EXHAUST AFTERTREATMENT FOR DIESEL ENGINE

INTRODUCTION

The present disclosure relates generally to control of exhaust aftertreatment of diesel engines and more particularly for treating diesel exhaust through an aftertreatment system having a diesel particulate filter and diesel exhaust fluid injection.

Current diesel engine exhaust aftertreatment systems include emission devices that are capable of removing particulate from diesel exhaust gas, converting oxides of Nitrogen NOx and Carbon Monoxide CO to water, Nitrogen, and Carbon Dioxide. However, under certain operating conditions, these devices not only fail to perform efficiently but also contribute additional harmful emissions to the diesel exhaust gas. Furthermore, increasingly stringent emissions regulations threaten to render the current aftertreatment systems no longer capable of meeting the new standards.

Accordingly, there is a need in the art for an improved diesel engine exhaust aftertreatment system and a method of controlling the improved system to meet current and future emissions regulations while maintaining or reducing overall vehicle cost.

SUMMARY

A method of controlling an exhaust system for a diesel engine is provided. The method comprises providing an aftertreatment system comprising a first catalyst and a diesel exhaust fluid injection system, determining a preliminary dose of a diesel exhaust fluid of the diesel exhaust fluid injection system based on an incoming exhaust gas flow and its temperature, determining an $NH_3$ factor based on incoming exhaust gas oxygen concentration and the incoming exhaust gas flow temperature, and determining a final dose of diesel exhaust fluid by multiplying the preliminary dose of diesel exhaust fluid by the $NH_3$ factor.

In one example of the present disclosure, the method further comprises injecting the final dose of diesel exhaust fluid into an incoming exhaust port of the first catalyst.

In another example of the present disclosure, providing an aftertreatment system comprising a first catalyst and a diesel exhaust fluid injection system further comprises providing an aftertreatment system comprising a first selective catalytic reduction catalyst, a diesel particulate filter, and a diesel exhaust fluid injection system.

In yet another example of the present disclosure, the method further comprises operating the diesel engine in a diesel particulate filter regeneration mode.

In yet another example of the present disclosure, providing an aftertreatment system comprising a first selective catalytic reduction catalyst, a diesel particulate filter, and a diesel exhaust fluid injection system further comprises providing an aftertreatment system comprising a first selective catalytic reduction catalyst, a second selective catalytic reduction catalyst, a diesel particulate filter, and a diesel exhaust fluid injection system. The diesel exhaust fluid injection system comprises a first and a second diesel exhaust fluid injector.

In yet another example of the present disclosure, providing an aftertreatment system comprising a catalyst and a diesel exhaust fluid injection system further comprises providing an aftertreatment system comprising a first selective catalytic reduction catalyst, a second selective catalytic reduction catalyst, a diesel oxidation catalyst, a diesel particulate filter, and a diesel exhaust fluid injection system.

In yet another example of the present disclosure, determining an $NH_3$ factor based on incoming exhaust gas oxygen concentration and the incoming exhaust gas flow temperature further comprises determining an $NH_3$ factor equal to between 0.0 and 1.0 when the incoming exhaust gas oxygen concentration is greater than a first threshold and the incoming exhaust gas flow temperature is greater than a second threshold.

In yet another example of the present disclosure, determining an $NH_3$ factor based on incoming exhaust gas oxygen concentration and the incoming exhaust gas flow temperature further comprises determining an $NH_3$ factor equal to 1.0 when one of the incoming exhaust gas oxygen concentration is less than a first threshold and the incoming exhaust gas flow temperature is less than a second threshold.

Another method of controlling an exhaust system for a diesel engine is provided. The method comprises providing an aftertreatment system comprising a first selective catalytic reduction catalyst, a diesel particulate filter, and a diesel exhaust fluid injection system, determining a preliminary dose of a diesel exhaust fluid of the diesel exhaust fluid injection system based on an incoming exhaust gas flow temperature, determining an $NH_3$ factor based on incoming exhaust gas oxygen concentration and the incoming exhaust gas flow temperature, determining a final dose of diesel exhaust fluid by multiplying the preliminary dose of diesel exhaust fluid by the $NH_3$ factor, injecting the final dose of diesel exhaust fluid into an incoming exhaust port of the first selective catalytic reduction catalyst.

In one example of the present disclosure, the method further comprises operating the diesel engine in a diesel particulate filter regeneration mode.

In another example of the present disclosure, providing an aftertreatment system comprising a first selective catalytic reduction catalyst, a diesel particulate filter, and a diesel exhaust fluid injection system further comprises providing an aftertreatment system comprising a first selective catalytic reduction catalyst, a second selective catalytic reduction catalyst, a diesel particulate filter, a diesel oxidation catalyst, and a diesel exhaust fluid injection system. The diesel exhaust fluid injection system comprises a first and a second diesel exhaust fluid injector.

In yet another example of the present disclosure, determining an $NH_3$ factor based on incoming exhaust gas oxygen concentration and the incoming exhaust gas flow temperature further comprises determining an $NH_3$ factor equal to between 0.0 and 1.0 when the incoming exhaust gas oxygen concentration is greater than a first threshold and the incoming exhaust gas flow temperature is greater than a second threshold.

In yet another example of the present disclosure, determining an $NH_3$ factor based on incoming exhaust gas oxygen concentration and the incoming exhaust gas flow temperature further comprises determining an $NH_3$ factor equal to 1.0 when one of the incoming exhaust gas oxygen concentration is less than a first threshold and the incoming exhaust gas flow temperature is less than a second threshold.

A diesel powertrain system for a vehicle is provided. The diesel powertrain system comprises a diesel engine, an aftertreatment exhaust system having an exhaust gas output, and a powertrain control module. The diesel engine has an exhaust gas output. The aftertreatment exhaust system has an exhaust gas input, a first selective catalytic reduction catalyst, and a diesel exhaust fluid injection system. The exhaust gas input is in communication with the exhaust gas output of the diesel engine. The powertrain control module has a control logic sequence. The powertrain control module controls the operation of the diesel powertrain system. The control logic sequence includes a first through fourth control logics. The first control logic determines a preliminary dose of a diesel exhaust fluid of the diesel exhaust fluid injection system based on an incoming exhaust gas flow and its temperature. The second control logic for determines an $NH_3$ factor based on incoming exhaust gas oxygen concentration and the incoming exhaust gas flow temperature. The third control logic for determines a final dose of diesel exhaust fluid of the diesel exhaust fluid injection system by multiplying the preliminary dose of diesel exhaust fluid by the $NH_3$ factor. The fourth control logic for commands the diesel exhaust fluid injection system to inject the final dose of diesel exhaust fluid into an incoming exhaust port of the first selective catalytic reduction catalyst.

In one example of the present disclosure, the aftertreatment exhaust system further includes a diesel oxidation catalyst, a diesel particulate filter, and a second selective catalytic reduction catalyst.

In another example of the present disclosure, the diesel exhaust fluid injection system includes a first injector disposed in a first input duct of the first selective catalytic reduction catalyst and a second injector disposed in a second duct of the second selective catalytic reduction catalyst.

In yet another example of the present disclosure, the first control logic for determining a preliminary dose of a diesel exhaust fluid of the diesel exhaust fluid injection system based on an incoming exhaust gas flow temperature further comprises determining a preliminary dose of a diesel exhaust fluid of the diesel exhaust fluid injection system based on an incoming exhaust gas flow temperature during a diesel particular filter regeneration.

In yet another example of the present disclosure, the second control logic for determining an $NH_3$ factor based on incoming exhaust gas oxygen concentration and the incoming exhaust gas flow temperature further comprises determining an $NH_3$ factor equal to between 0.0 and 1.0 when the incoming exhaust gas oxygen concentration is greater than a first threshold and the incoming exhaust gas flow temperature is greater than a second threshold.

In yet another example of the present disclosure, the second control logic for determining an $NH_3$ factor based on incoming exhaust gas oxygen concentration and the incoming exhaust gas flow temperature further comprises determining an $NH_3$ factor equal to 1.0 when one of the incoming exhaust gas oxygen concentration is less than a first threshold and the incoming exhaust gas flow temperature is less than a second threshold.

In yet another example of the present disclosure, the first control logic determines a preliminary dose of a diesel exhaust fluid of the diesel exhaust fluid injection system based on an incoming exhaust gas flow and its temperature further comprises determining a first preliminary dose of a diesel exhaust fluid of the diesel exhaust fluid injection system based on a first incoming exhaust gas flow temperature of the first selective catalytic reduction catalyst and determining a second preliminary dose of a diesel exhaust fluid of the diesel exhaust fluid injection system based on a second incoming exhaust gas flow temperature of the second selective catalytic reduction catalyst. The second control logic determines an $NH_3$ factor based on incoming exhaust gas oxygen concentration and the incoming exhaust gas flow temperature further comprises determining a first $NH_3$ factor equal to between 0.0 and 1.0 when a first incoming exhaust gas oxygen concentration is greater than a first threshold and the incoming exhaust gas flow temperature is greater than a second threshold and determining a second $NH_3$ factor equal to between 0.0 and 1.0 when a second incoming exhaust gas oxygen concentration is greater than the first threshold and the incoming exhaust gas flow temperature is greater than the second threshold. The third control logic determines a final dose of diesel exhaust fluid of the diesel exhaust fluid injection system by multiplying the preliminary dose of diesel exhaust fluid by the $NH_3$ factor further comprises determining a first final dose of diesel exhaust fluid of the diesel exhaust fluid injection system by multiplying the first preliminary dose of diesel exhaust fluid by the first $NH_3$ factor and determining a second final dose of diesel exhaust fluid of the diesel exhaust fluid injection system by multiplying the second preliminary dose of diesel exhaust fluid by the second $NH_3$ factor. The fourth control logic commands the diesel exhaust fluid injection system to inject the final dose of diesel exhaust fluid into an incoming exhaust port of the first selective catalytic reduction catalyst further comprises commanding the first diesel exhaust fluid injector diesel of the exhaust fluid injection system to inject the first final dose of diesel exhaust fluid into a first incoming exhaust port of the first selective catalytic reduction catalyst and commanding the second diesel exhaust fluid injector diesel of the diesel exhaust fluid injection system to inject the second final dose of diesel exhaust fluid into a second incoming exhaust port of the second selective catalytic reduction catalyst.

The above features and advantages and other features and advantages of the present disclosure are readily apparent from the following detailed description when taken in connection with the accompanying drawings.

BRIEF DESCRIPTION OF THE DRAWINGS

The drawings described herein are for illustration purposes only and are not intended to limit the scope of the present disclosure in any way.

DESCRIPTION

The following description is merely exemplary in nature and is not intended to limit the present disclosure, application, or uses.

Figure 1:
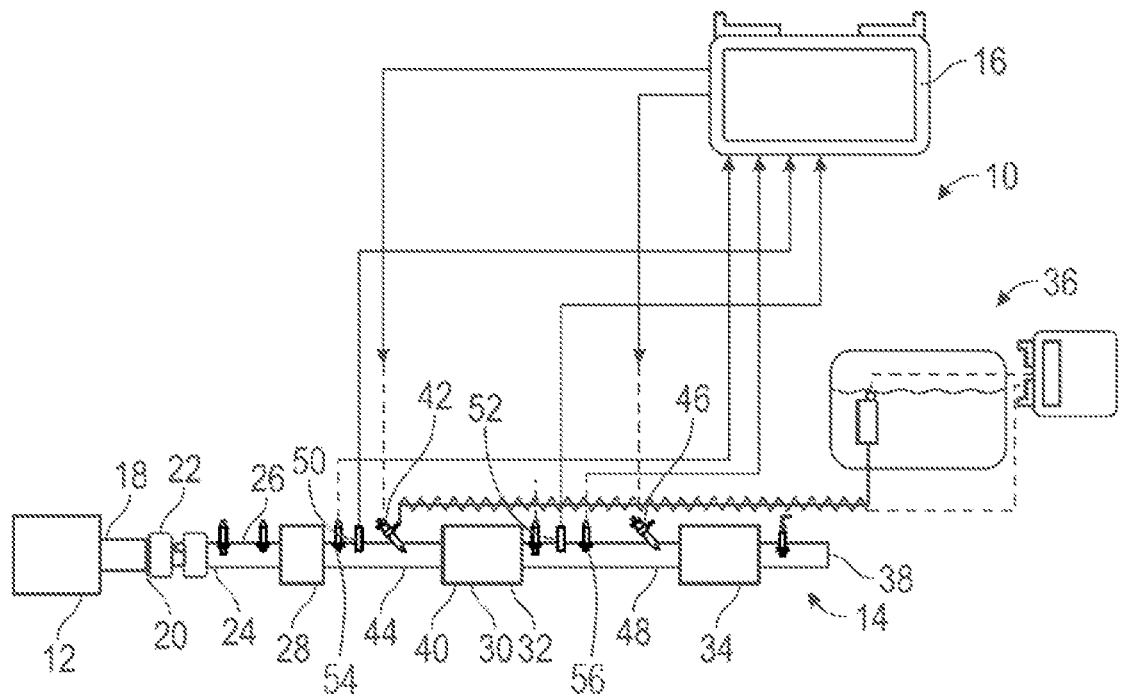
FIG. 1 is a schematic view of a diesel engine and an exhaust aftertreatment assembly according to the principles of the present disclosure.

Examples of the present disclosure advantageously provide a powertrain system 10 as illustrated in FIG. 1. The powertrain system 10, as will now be described, includes a diesel engine 12, a diesel exhaust aftertreatment system 14, and a powertrain control module 16. More particularly, the diesel engine 12 includes at least one exhaust manifold 18 having an exhaust gas outlet 20. However, the diesel engine 12 may also include a turbocharger 22 integrated into the exhaust manifold 18 in which case the exhaust gas outlet 24 of the turbocharger 22 is the exhaust gas outlet 20 of the diesel engine 12.

The diesel exhaust aftertreatment system 14 includes an exhaust gas input duct 26, a diesel oxidation catalyst (DOC) 28, a diesel particulate filter (DPF) 30, a first selective catalytic reduction (SCR) catalyst 32, a second SCR catalyst 34, a diesel exhaust fluid (DEF) injection system 36 and a treated exhaust gas outlet 38. In the present disclosure, the DPF 30 is combined with the first SCR catalyst 32 in the form of an SCR on filter catalyst or SCRF catalyst 40. In either architecture, the exhaust gas from the diesel engine 12 flows in series from one element of the diesel exhaust aftertreatment system 14 to the next. For example, the exhaust gas input duct 26 is in fluid communication with the exhaust gas outlet 24 of the turbocharger 22. The exhaust gas input duct 26 feeds exhaust gas to the DOC 28 which in turn feeds the SCRF catalyst 40. The second SCR catalyst 34 receives treated exhaust gas from the SCRF catalyst 40. Next, the treated exhaust gas exits the treated exhaust gas outlet 38 into the environment.

The functions of the elements of the diesel exhaust aftertreatment system 14 are as follows. The DOC 28 oxidizes carbon monoxide (CO), unburnt diesel fuel, oil, particulate matter and other exhaust gas constituents from the diesel engine 12 into water and carbon dioxide ($CO_2$). The DPF 30 physically separates the remainder of the particulate matter using a flow-through filter which allows exhaust gas to pass through while capturing the larger particulate particles. On occasion, the exhaust gas flow through the DPF 30 becomes restricted and thus the DPF 30 requires regeneration. Regeneration is a mode of operating the diesel engine that produces exhaust gas having a high enough temperature (about 600° C.) to burn off the particulate accumulated in the DPF 30. During regeneration, exhaust gas emissions increase in $NO_x$ and odor.

The SCR catalyst 32, 34 in coordination with DEF injection system 36 converts $NO_x$ into $N_2$ and water. The DEF injection system 36 includes an injector for each SCR catalyst 32, 34. For example, a first DEF injector 42 is disposed proximate the exhaust input duct 44 of the first SCR catalyst 32 and a second DEF injector 46 is disposed proximate the exhaust input duct 48 of the second SCR catalyst 34. The DEF injectors 42, 46 inject DEF into the exhaust input ducts 44, 48 which reacts with $NO_x$ of the exhaust gas in the SCR catalysts 32, 34 to form $N_2$, water, and $CO_2$.

The powertrain control module 16 is preferably an electronic control device having a preprogrammed digital computer or processor, control logic, memory used to store data, and at least one I/O peripheral. The control logic includes a plurality of logic routines for monitoring, manipulating, and generating data. The powertrain control module 16 controls the plurality of actuators, pumps, valves, and other devices associated with powertrain system 10 control according to the principles of the present disclosure. The control logic may be implemented in hardware, software, or a combination of hardware and software. For example, control logic may be in the form of program code that is stored on the electronic memory storage and executable by the processor. The powertrain control module 16 receives the output signal of each of several sensors on the vehicle, performs the control logic and sends command signals to several control devices. For example, a control logic implemented in software program code that is executable by the processor of the powertrain control module 16 includes a control logic for implementing a method described further below.

Figure 2:
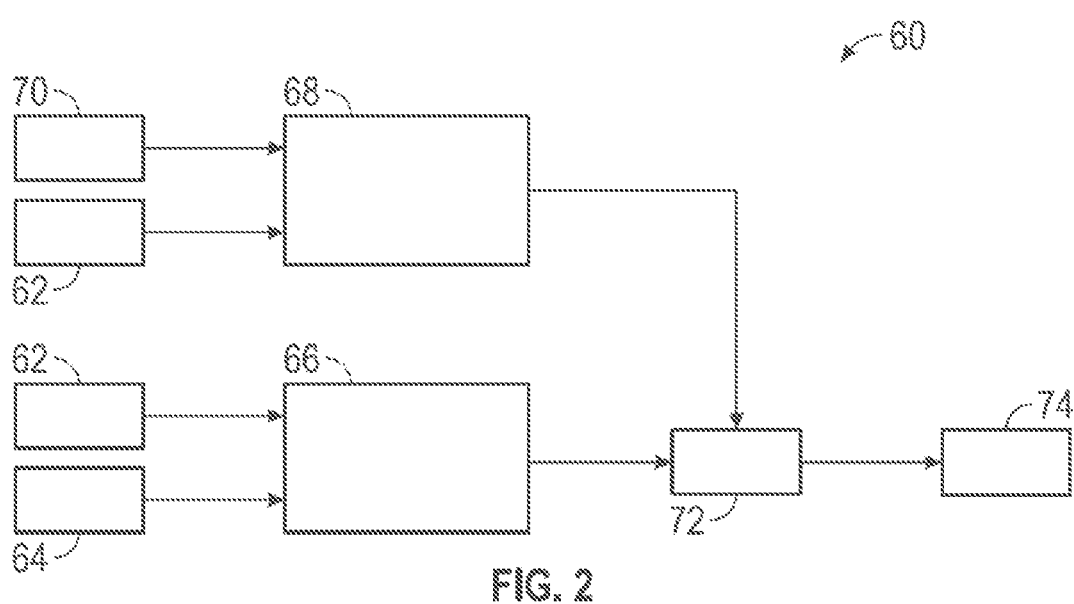
FIG. 2 is a flowchart depicting a method for controlling an exhaust aftertreatment for a diesel engine according to the principles of the present disclosure.

Found to reduce the effectiveness of the SCR catalysts 32, 34 to reduce $NO_x$ during certain operating conditions, a method 60 of controlling the diesel exhaust aftertreatment system 14 is illustrated in the flowchart of FIG. 2. The method 60 provides the capability to improve the NOx and $NH_3$ emissions in the high temperature range area, especially in Full Load and in DPF regeneration. The method 60 is able to recognize the working area where a $NO_x$ remake phenomena can occur (e.g., DPF Regeneration) or not (full load area or spontaneous DPF Regeneration in Full Load). The recognition logic is based on exhaust temperature and the 02 concentration level measured upstream the SCR catalysts 32, 34. It must be noted that the diesel exhaust aftertreatment system 14 also includes a first and second exhaust gas temperature sensors 50, 52 disposed in the exhaust input ducts 44, 48 of each of the SCR catalysts 32, 34. Furthermore, a first and a second oxygen (O2) sensors 54, 56 are also disposed in the exhaust input ducts 44, 48 of each of the SCR catalysts 32, 34. The method 60 includes a first step 62 in which the temperature of the upstream exhaust gas 64 is detected by the first and second exhaust gas temperature sensor 50, 52 and sent to and received by the powertrain control module 16. A second step 66 calculates a preliminary DEF dose is calculated based upon the temperature of the upstream exhaust gas 64 prior to the particular SCR catalysts 32, 34. In a third step 68 the powertrain control module 16 calculates an $NH_3$ factor based on incoming exhaust gas oxygen concentration 70 as detected by the O2 sensors 54, 56 and the incoming exhaust gas flow temperatures 62. The $NH_3$ factor is equal to between 0.0 and 1.0 when the incoming exhaust gas oxygen concentration is greater than a first threshold and the incoming exhaust gas flow temperature is greater than a second threshold. The $NH_3$ factor is equal to 1.0 when one of the incoming exhaust gas oxygen concentration 70 is less than the first threshold and the incoming exhaust gas flow temperature 62 is less than the second threshold. A threshold hysteresis is incorporated into the determination in order to avoid toggling between $NH_3$ factors when near the first and second thresholds. In a fourth step 72, the preliminary DEF dose is multiplied by the $NH_3$ factor which results in a final DEF dose. A fifth step 74 includes the powertrain control module 16 directing the particular DEF injector 42, 46 to provide the final DEF dose into the exhaust input ducts 44, 48 of each of the SCR catalysts 32, 34 for which the final DEF dose is calculated. The result is the optimal DEF dose for a particular set of diesel engine operating conditions that normally result in high NOx concentration in the exhaust gas exiting the treated exhaust gas outlet 38. One such diesel engine operating condition includes high load operating conditions resulting in high exhaust gas temperatures. Another diesel operating condition is during DPF 30 regeneration which by definition includes high exhaust gas temperatures required to burn off particulate trapped by the DPF 30.

Incorporating the above disclosed method 60 into control logic that is operational by the powertrain control module 16 includes a first control logic for determining a first and second preliminary dose of a diesel exhaust fluid of the diesel exhaust fluid injection system. The first preliminary dose is based on a first incoming exhaust gas flow temperature of the first selective catalytic reduction catalyst. The second preliminary dose of a diesel exhaust fluid of the diesel exhaust fluid injection system based on a second incoming exhaust gas flow temperature of the second selective catalytic reduction catalyst. A second control logic determines a first and a second $NH_3$ factor equal to between 0.0 and 1.0 when a first incoming exhaust gas oxygen concentration is greater than a first threshold and the incoming exhaust gas flow temperature is greater than a second threshold. The second NH₃ factor is equal to between 0.0 and 1.0 when a second incoming exhaust gas oxygen concentration is greater than the first threshold and the incoming exhaust gas flow temperature is greater than the second threshold. A third control logic determines a first and a second final dose of diesel exhaust fluid of the diesel exhaust fluid injection system by multiplying the first preliminary dose of diesel exhaust fluid by the first NH₃ factor. The second final dose of diesel exhaust fluid of the diesel exhaust fluid injection system by multiplying the second preliminary dose of diesel exhaust fluid by the second NH₃ factor. A fourth control logic commands the first and the second diesel exhaust fluid injectors of the exhaust fluid injection system to inject the first final dose of diesel exhaust fluid into a first incoming exhaust port of the first selective catalytic reduction catalyst. The second diesel exhaust fluid injector diesel of the diesel exhaust fluid injection system to inject the second final dose of diesel exhaust fluid into a second incoming exhaust port of the second selective catalytic reduction catalyst.

Figure 3:
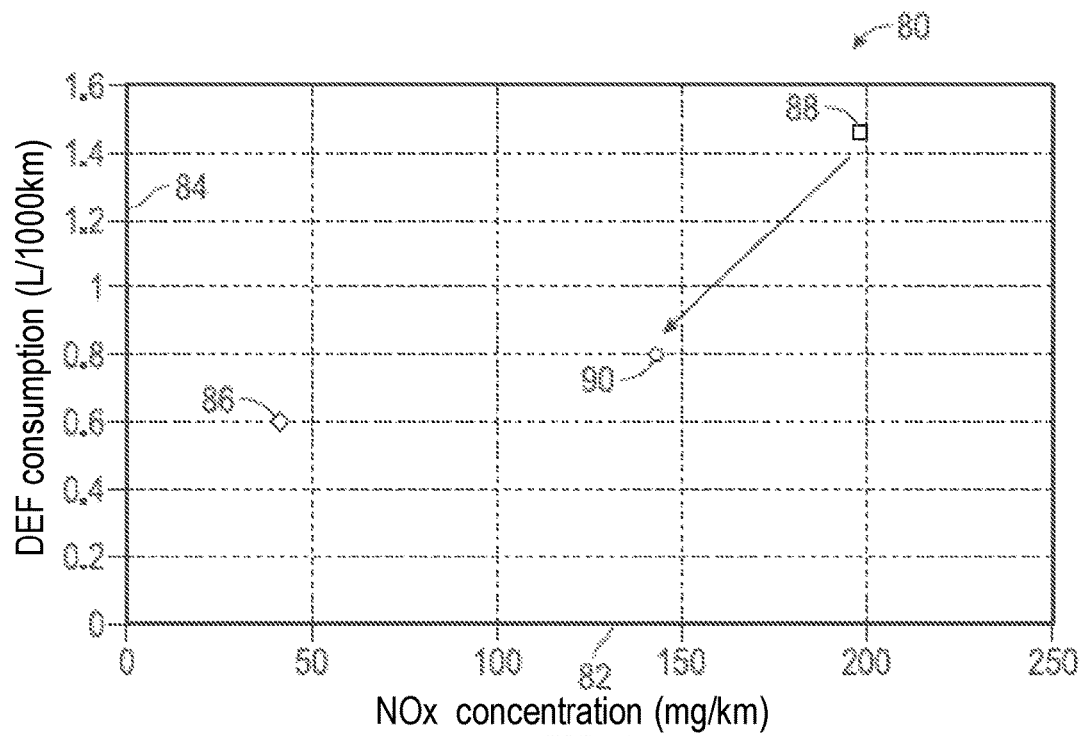
FIG. 3 is a chart depicting performance data of an exhaust aftertreatment for a diesel engine according to the principles of the present disclosure.
Figure 4:
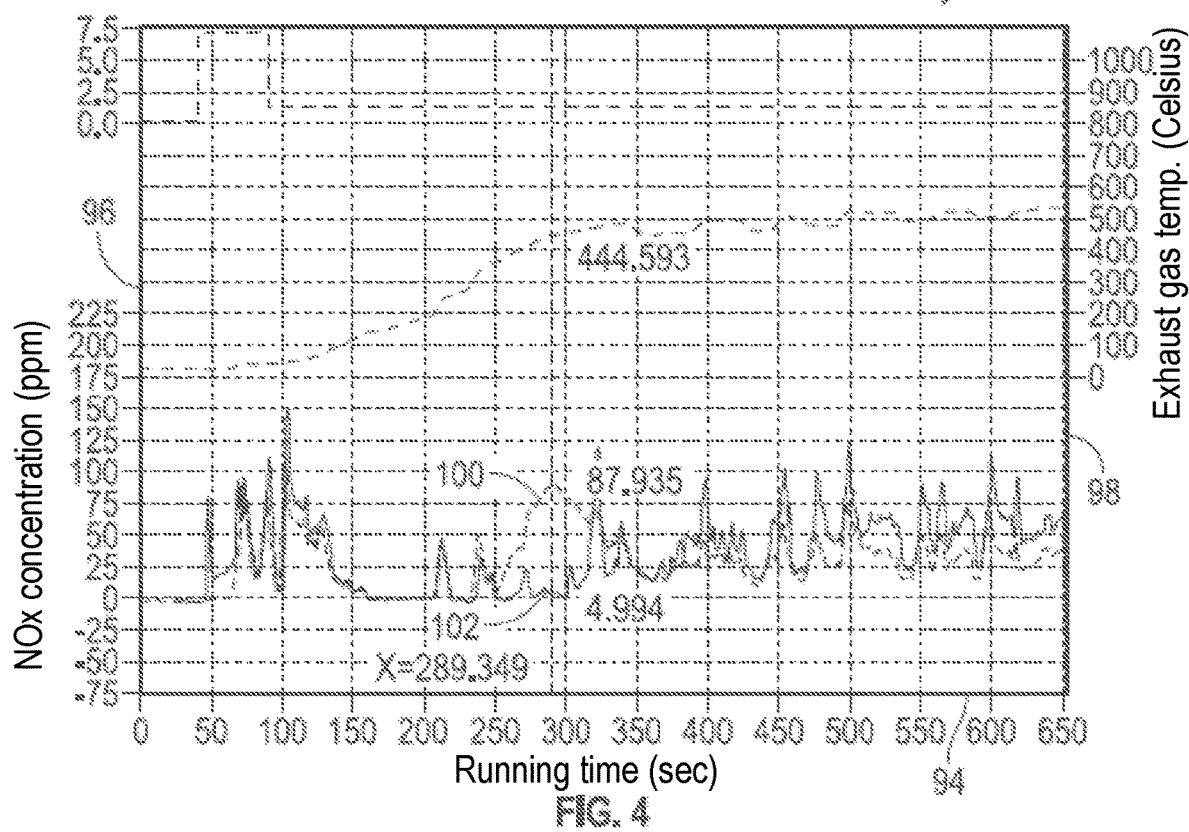
FIG. 4 is a chart depicting performance data of an exhaust aftertreatment for a diesel engine according to the principles of the present disclosure.

Turning now to FIGS. 3 and 4, a first graph 80 depicts the performance improvement of the diesel exhaust aftertreatment system 14 when the diesel engine 12 is operating in the DPF 30 regeneration mode. The x-axis 82 displays the NOx concentration in mg/km in the exhaust gas exiting the treated exhaust gas outlet 38. The y-axis 84 depicts DEF consumption in L/1000 km. The first data point 86 is a reference cycle without DFP 30 regeneration. The second data point 88 is the diesel engine 12 running in DFP 30 regeneration without the using the method 60. The third data point 90 is the diesel engine 12 running in DFP regeneration in combination with the DEF injection system running with the method 60.

The second graph 92 shown in FIG. 4 depicts the performance improvement of the diesel exhaust aftertreatment system 14 when the diesel engine 12 is operating under high load conditions. The x-axis 94 displays running time (s). The first y-axis 96 displays the NOx concentration in parts per million in the exhaust gas exiting the treated exhaust gas outlet 38. The second y-axis 98 displays the exhaust gas temperature (° C.). The first data series 100 represents the diesel engine 12 and diesel exhaust aftertreatment system 14 running without the method 60 described above. The second data series 102 represents the diesel engine 12 and diesel exhaust aftertreatment system 14 running with the method 60. A significant reduction in NOx concentration, from 87.935 ppm to 4.994 is shown at 289.349 seconds and 444° C. when the diesel exhaust aftertreatment system 14 is using the method 60 of the present disclosure.

While examples have been described in detail, those familiar with the art to which this disclosure relates will recognize various alternative designs and examples for practicing the disclosed structure within the scope of the appended claims.

The following is claimed:

1. A method of controlling an exhaust system for a diesel engine, the method comprising:
    providing an aftertreatment system comprising a first catalyst and a diesel exhaust fluid injection system;
    determining a preliminary dose of a diesel exhaust fluid of the diesel exhaust fluid injection system based on an exhaust gas temperature of an exhaust gas flow;
    determining an NH3 factor based on the exhaust gas temperature of the exhaust gas entering the first catalyst and an exhaust gas oxygen concentration of the exhaust gas entering the first catalyst;
    wherein determining the NH3 factor includes:
        determining whether the exhaust gas temperature of the exhaust gas entering the first catalyst is less than a first threshold;
        determining whether the exhaust gas oxygen concentration of the exhaust gas entering the first catalyst is less than a second threshold; and
        in response to determining that the exhaust the exhaust gas temperature of the exhaust gas entering the first catalyst is less than the first threshold and determining that the exhaust gas oxygen concentration of the exhaust gas entering the first catalyst is less than the second threshold, setting the NH3 factor to 1;
    determining a final dose of diesel exhaust fluid by multiplying the preliminary dose of the diesel exhaust fluid by the NH3 factor; and
    injecting the final dose of diesel exhaust fluid into an incoming exhaust port of the first catalyst.

2. The method of claim 1 wherein providing the aftertreatment system comprising the first catalyst and the diesel exhaust fluid injection system is further defined as providing the aftertreatment system comprising a first selective catalytic reduction catalyst, a diesel particulate filter, and the diesel exhaust fluid injection system.

3. The method of claim 2 further comprising operating the diesel engine in a diesel particulate filter regeneration mode.

4. The method of claim 3 wherein providing the aftertreatment system comprising the first selective catalytic reduction catalyst, the diesel particulate filter, and the diesel exhaust fluid injection system is further defined as providing the aftertreatment system comprising the first selective catalytic reduction catalyst, a second selective catalytic reduction catalyst, the diesel particulate filter, and the diesel exhaust fluid injection system, and wherein the diesel exhaust fluid injection system comprises a first and a second diesel exhaust fluid injector.

5. The method of claim 1 wherein providing the aftertreatment system comprising the first catalyst and the diesel exhaust fluid injection system is further defined as providing the aftertreatment system comprising a first selective catalytic reduction catalyst, a second selective catalytic reduction catalyst, a diesel oxidation catalyst, a diesel particulate filter, and the diesel exhaust fluid injection system.

6. A method of controlling an exhaust system for a diesel engine, the method comprising:
    providing an aftertreatment system comprising a first selective catalytic reduction catalyst, a diesel particulate filter, and a diesel exhaust fluid injection system;
    determining a preliminary dose of a diesel exhaust fluid of the diesel exhaust fluid injection system based on an exhaust gas temperature of an exhaust gas flow;
    setting an NH3 factor based on the exhaust gas temperature of the exhaust gas entering the first selective catalytic reduction catalyst and an exhaust gas oxygen concentration of the exhaust gas entering the first selective catalytic reduction catalyst, wherein setting the NH3 factor includes:
        determining whether the exhaust gas temperature of the exhaust gas entering the first selective catalytic reduction catalyst is greater than a first threshold;
        determining whether the exhaust gas oxygen concentration of the exhaust gas entering the first selective catalytic reduction catalyst is greater than a second threshold; and
        in response to determining that the exhaust the exhaust gas temperature of the exhaust gas entering the first selective catalytic reduction catalyst is greater than the first threshold and determining that the exhaust gas oxygen concentration of the exhaust gas entering the first selective catalytic reduction catalyst is greater than the second threshold, setting the NH3 factor to between 0.0 and 1.0;

determining a final dose of diesel exhaust fluid by multiplying the preliminary dose of the diesel exhaust fluid by the NH3 factor; and injecting the final dose of diesel exhaust fluid into an incoming exhaust port of the first selective catalytic reduction catalyst.

7. The method of claim 6 further comprising operating the diesel engine in a diesel particulate filter regeneration mode, and the method further comprises setting the NH3 factor to 0.4 in response to determining that the exhaust the exhaust gas temperature of the exhaust gas entering the first selective catalytic reduction catalyst is greater than the first threshold and determining that the exhaust gas oxygen concentration of the exhaust gas entering the first selective catalytic reduction catalyst is greater than a second threshold.

8. The method of claim 7 wherein providing the aftertreatment system comprising the first selective catalytic reduction catalyst, the diesel particulate filter and the diesel exhaust fluid injection system is further defined as providing the aftertreatment system comprising the first selective catalytic reduction catalyst, a second selective catalytic reduction catalyst, the diesel particulate filter, a diesel oxidation catalyst, and the diesel exhaust fluid injection system, and wherein the diesel exhaust fluid injection system comprises a first and a second diesel exhaust fluid injector.

9. A diesel powertrain system for a vehicle, the diesel powertrain system comprising:

a diesel engine having an exhaust gas output;

an aftertreatment exhaust system having an exhaust gas input, a first selective catalytic reduction catalyst, and a diesel exhaust fluid injection system, a temperature senor coupled to the exhaust gas input, and an oxygen sensor coupled to the exhaust gas input, and wherein the exhaust gas input is in communication with the exhaust gas output of the diesel engine, the temperature sensor is configured to measure an exhaust gas temperature of an exhaust gas entering the first selective catalytic reduction catalyst, and the oxygen sensor is configured to measure an exhaust gas oxygen concentration of the exhaust gas entering the first selective catalytic reduction catalyst;

a powertrain control module having a control logic sequence, and wherein the powertrain control module controls the diesel powertrain system and the control logic sequence includes:

a first control logic for determining a preliminary dose of a diesel exhaust fluid of the diesel exhaust fluid injection system based on an exhaust gas temperature of an exhaust gas flow;

a second control logic for setting an NH3 factor based on the exhaust gas temperature of the exhaust gas entering the first selective catalytic reduction catalyst and the exhaust gas oxygen concentration of the exhaust gas entering the first selective catalytic reduction catalyst, wherein the power control module is programmed to:

determine whether the exhaust gas temperature of the exhaust gas entering the first selective catalytic reduction catalyst is less than a first threshold using an input from the temperature sensor;

determining whether the exhaust gas oxygen concentration of the exhaust gas entering the first selective catalytic reduction catalyst is less than a second threshold using an input from the oxygen sensor; and in response to determining that the exhaust the exhaust gas temperature of the exhaust gas entering the first selective catalytic reduction catalyst is less than the first threshold and determining that the exhaust gas oxygen concentration of the exhaust gas entering the first selective catalytic reduction catalyst is less than the second threshold, setting the NH3 factor to 1;

a third control logic for determining a final dose of diesel exhaust fluid of the diesel exhaust fluid injection system by multiplying the preliminary dose of the diesel exhaust fluid by the NH3 factor; and a fourth control logic for commanding the diesel exhaust fluid injection system to inject the final dose of diesel exhaust fluid into an incoming exhaust port of the first selective catalytic reduction catalyst.

10. The diesel powertrain system of claim 9 wherein the aftertreatment exhaust system further includes a diesel oxidation catalyst, a diesel particulate filter, and a second selective catalytic reduction catalyst.

11. The diesel powertrain system of claim 10 wherein the diesel exhaust fluid injection system includes a first injector disposed in a first input duct of the first selective catalytic reduction catalyst and a second injector disposed in a second duct of the second selective catalytic reduction catalyst.

12. The diesel powertrain system of claim 9 wherein the first control logic for determining a preliminary dose of a diesel exhaust fluid of the diesel exhaust fluid injection system based on an incoming exhaust gas flow temperature further comprises determining a preliminary dose of a diesel exhaust fluid of the diesel exhaust fluid injection system based on an incoming exhaust gas flow temperature during a diesel particulate filter regeneration.

* * * * *